(12) United States Patent
Miyoshi et al.

(10) Patent No.: US 11,299,055 B2
(45) Date of Patent: Apr. 12, 2022

(54) NON-CONTACT POWER SUPPLY DEVICE

(71) Applicant: TOSHIBA TEC KABUSHIKI KAISHA, Tokyo (JP)

(72) Inventors: Ryohei Miyoshi, Izunokuni Shizuoka (JP); Kazuyuki Matsumura, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 16/886,285

(22) Filed: May 28, 2020

(65) Prior Publication Data

US 2021/0001741 A1 Jan. 7, 2021

(30) Foreign Application Priority Data

Jul. 2, 2019 (JP) .............................. JP2019-124055

(51) Int. Cl.
*B60L 53/38* (2019.01)
*H02J 50/40* (2016.01)
*G06K 7/10* (2006.01)
*H02J 50/90* (2016.01)

(52) U.S. Cl.
CPC .......... *B60L 53/38* (2019.02); *G06K 7/10881* (2013.01); *H02J 50/40* (2016.02); *H02J 50/90* (2016.02); *B60L 2200/30* (2013.01)

(58) Field of Classification Search
CPC ....................................................... H20J 50/90
USPC ......................................................... 320/108
See application file for complete search history.

(56) References Cited

U.S. PATENT DOCUMENTS

| 10,336,197 | B2 | 7/2019 | Kotani et al. |
| 2015/0112825 | A1 | 4/2015 | Konishi et al. |
| 2019/0123598 | A1* | 4/2019 | Patmore ................ H02J 7/0044 |
| 2019/0207427 | A1* | 7/2019 | McNeally ................ B62B 3/14 |

FOREIGN PATENT DOCUMENTS

JP 4469290 B2 5/2010

* cited by examiner

*Primary Examiner* — Edward Tso
*Assistant Examiner* — Ahmed H Omar
(74) *Attorney, Agent, or Firm* — Kim & Stewart LLP

(57) ABSTRACT

A non-contact charging cart station includes a housing and a plurality of non-contact charging devices. The housing has a cart placement region on which stackable carts or the like can be inserted along a cart placement direction. The plurality of non-contact charging devices are in the housing and aligned in the cart placement region along the cart placement direction.

11 Claims, 5 Drawing Sheets

NON-CONTACT POWER SUPPLY DEVICE

CROSS-REFERENCE TO RELATED APPLICATION

This application is based upon and claims the benefit of priority from Japanese Patent Application No. 2019-124055, filed on Jul. 2, 2019, the entire contents of which are incorporated herein by reference.

FIELD

Embodiments of the present disclosure relate to a non-contact power supply device.

BACKGROUND

In a retail store such as a supermarket, a shopping cart is often used. It is possible to improve customer convenience by attaching an electronic apparatus to the shopping cart, such as a commodity registration apparatus for reading commodity information of items being put into the shopping cart for purchase.

However, when an electronic device is attached to the cart, it becomes necessary to supply power to charge a battery for powering the attached electronic device. As a method of charging, there is a method of charging by a wired connection, such as a plug, may be considered. However, the use of a wired connection tends to cause various operational restrictions and difficulties. There is also a method of charging by non-contact power supply. In the case of non-contact power supply, power can be supplied wirelessly from a power transmitting unit to a power receiving unit on the cart and the restrictions and difficulties associated with wired connections can be avoided.

In general, it is desirable to precisely position the cart relative to the power transmitting unit. However, since the cart is mobile and in general free to move along the floor in any direction, it is difficult to position the cart, and keep the cart positioned precisely, relative to the installation position of the power transmitting unit.

DETAILED DESCRIPTION

In general, according to an embodiment, a non-contact charging cart station includes a housing and a plurality of non-contact charging devices. The housing has a cart placement region in which carts can be inserted along a cart placement direction. The plurality of non-contact charging devices are in the housing and aligned in the cart placement region along the cart placement direction.

Hereinafter, example embodiments of the present disclosure will be described with reference to the accompanying drawings. It should be noted that these example embodiments described below are not intended to limit the scope of the present disclosure. In the following examples, a non-contact power supply device that wirelessly supplies power to a shopping cart equipped with an electronic commodity registration apparatus for use in a retail store is described. The non-contact power supply device of the present disclosure is not limited to such an application or location, and, in general, any mobile apparatus or the like incorporating a battery or charge storage unit can be charged by the non-contact power supply device of the present disclosure.

Figure 1:
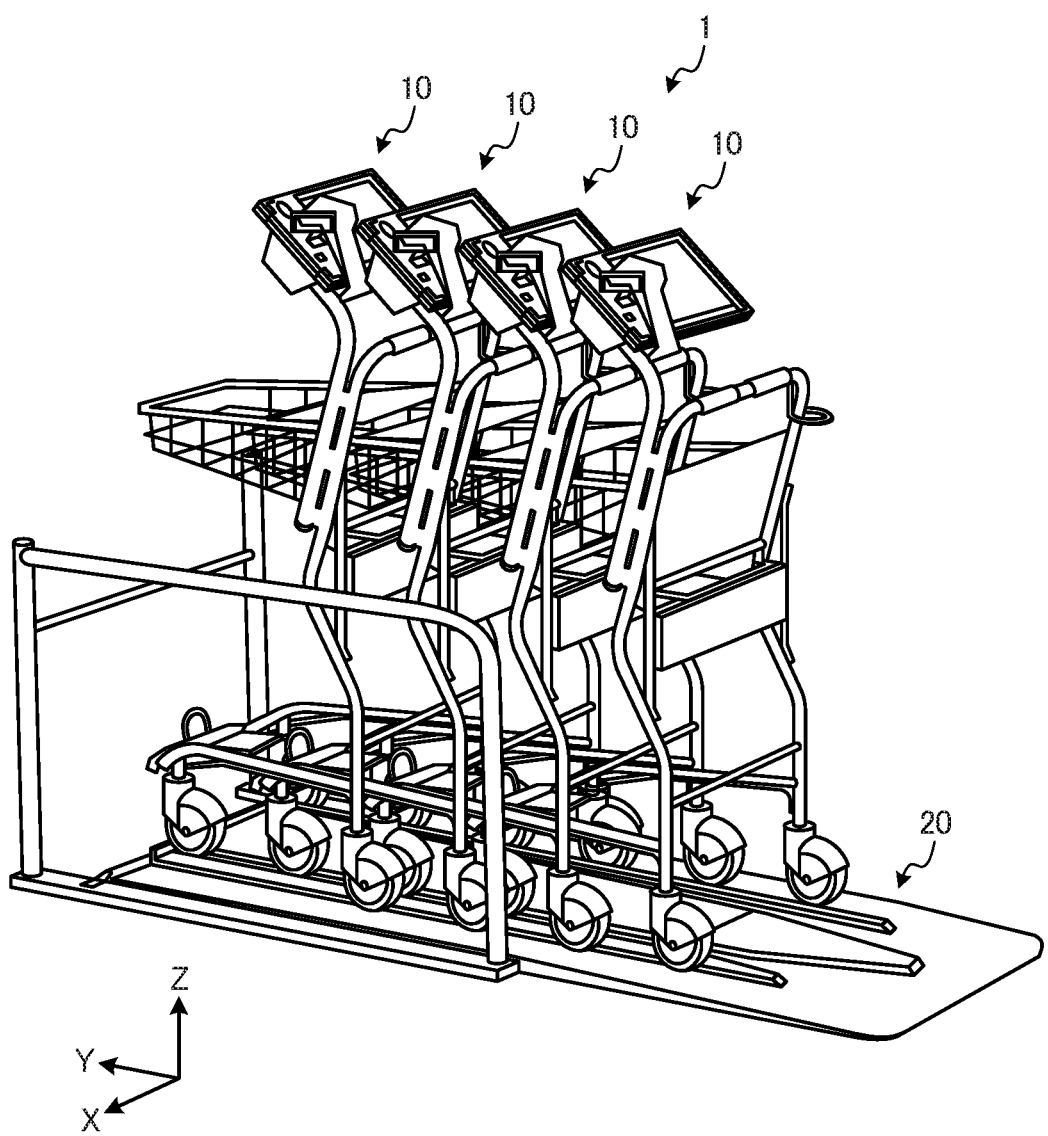
FIG. 1 illustrates a perspective view of a non-contact power supply system according to an embodiment.

FIG. 1 illustrates a perspective view of an example of a non-contact power supply system 1 according to the present embodiment. The non-contact power supply system 1 includes a cart 10 and a non-contact power supply device 20 (hereinafter referred to as a non-contact charging cart station 20). FIG. 1 shows a case where a non-contact charging cart station 20 is placed at a retail store.

Figure 2:
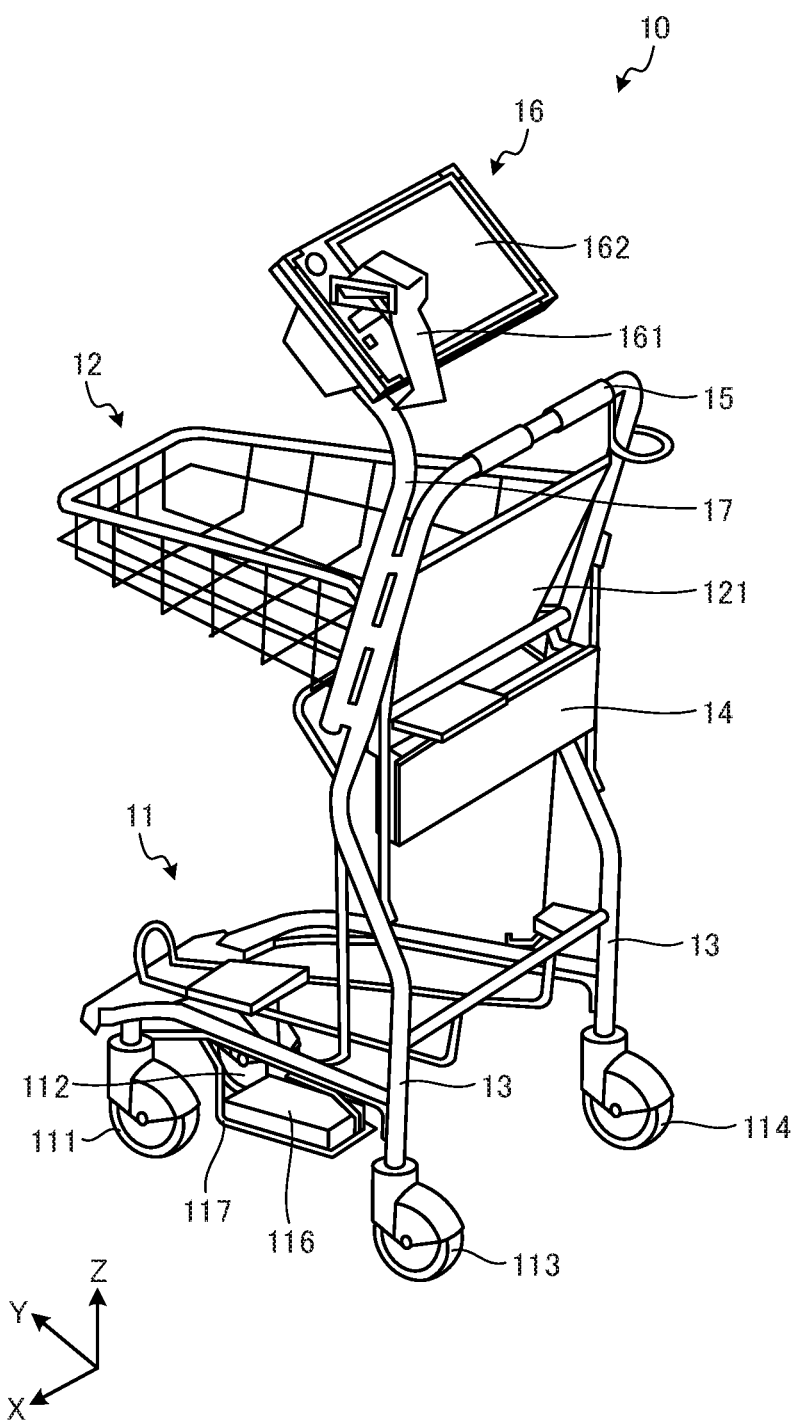
FIG. 2 illustrates a perspective view of a cart.

FIG. 2 illustrates a perspective view of an example of the cart 10. In a retail store such as a supermarket, an item (commodity) which a customer selects for purchase is placed in a cart 10. The cart 10 is a pushcart or the like that can be moved about the store by the customer.

Cart 10 includes a base portion 11 for movement. The base portion 11 is includes a pair of front wheels 111 and 112 and a pair of rear wheels 113 and 114. The distance between the front wheel 111 and the front wheel 112 is smaller than the distance between the rear wheel 113 and the rear wheel 114. A mounting part 117 is disposed below the base portion 11. A power receiving unit 116, which receives electric power by non-contact power supply, is attached to the mounting part 117. The power receiving unit 116 is disposed substantially horizontally.

A housing part 12 is disposed above the base portion 11. In this example, the housing part 12 is basket-like. The housing part 12 is supported by a support column 13 extending from the base portion 11. The flap 121 on the rear side of the housing part 12 is hinged or the like so that flap 121 can be opened and closed. Therefore, as shown in FIG. 1, by inserting the housing part 12 of the one cart 10 into the housing part 12 of another cart 10, it is possible to stack several carts 10 in a relatively narrow area. It is noted that the cart 10 does not have to include a basket-like housing part 12. For example, in some embodiments, the housing part 12 of the cart 10 may have a basket receiving part for detachably mounting a hand-carriable commodity basket or the like thereon.

A holder 14 containing a secondary battery is disposed below the housing part 12. The secondary battery is a battery for storing the electric power received by the power receiving unit 116.

The support column 13 includes a handle portion 15 to be gripped by a customer using the cart 10. The support column 13 includes a support part 17 for supporting the commodity registration apparatus 16.

The commodity registration apparatus 16 is an apparatus for registering items for sale. The commodity registration apparatus 16 includes a scanner 161 and a display unit 162. The scanner 161 reads commodity information of the item for sale. For example, the scanner 161 reads a bar code or the like disposed on the item for sale. The display unit 162 is, for example, a touch panel display. The display unit 162 displays, for example, a commodity name and other information related to an item scanned with the scanner 161. The commodity registration apparatus 16 is powered by the secondary battery stored in the holder 14.

Figure 3:
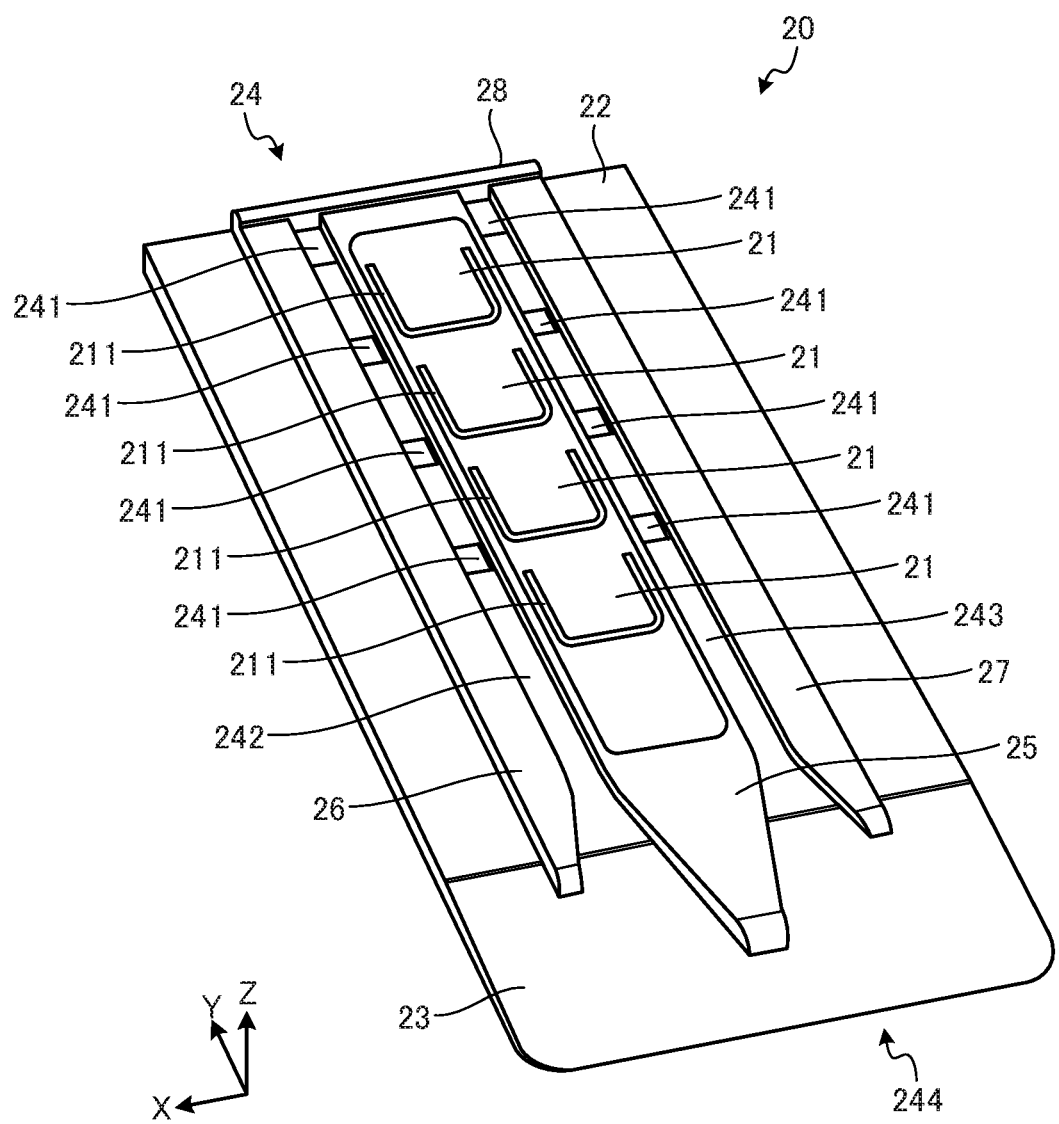
FIG. 3 illustrates a perspective view of a non-contact power supply device according to an embodiment.

Next, a description will be given of the non-contact charging cart station 20. FIG. 3 illustrates a perspective view of an example of the non-contact charging cart station 20.

Figure 4:
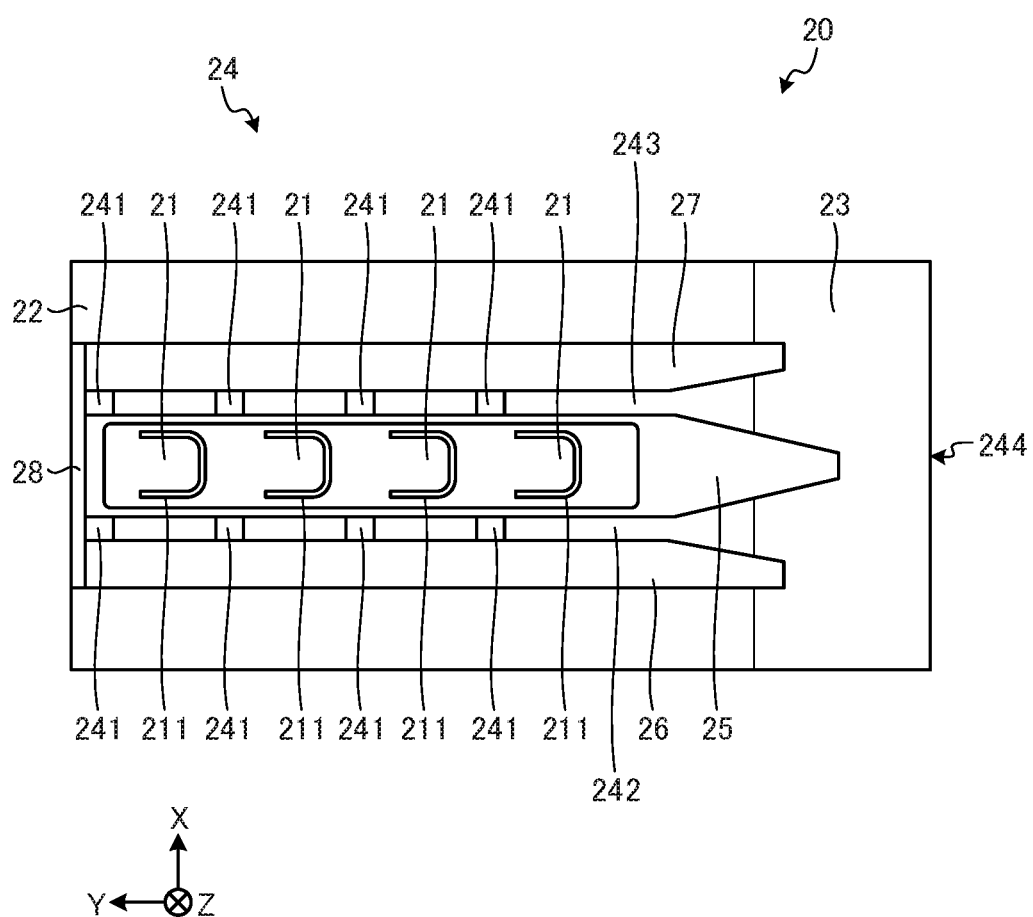
FIG. 4 illustrates a top view of a non-contact power supply device according to an embodiment.

FIG. 4 illustrates a top view of an example of the non-contact charging cart station 20. The non-contact charging cart station 20 includes a power transmitting unit 21 for transmitting electric power to a power receiving unit 116 of a cart 10 mounted thereon by non-contact power supply. When the power receiving unit 116 of the cart 10 is not located at a position opposed to the power transmitting unit 21 of the non-contact charging cart station 20, the power supply efficiency is deteriorated. To address this issue, the non-contact charging cart station 20 is configured such that the cart 10 can be easily arranged at a position where the power receiving unit 116 and the power transmitting unit 21 are opposed to each other. In FIGS. 1 to 5, it is assumed that the direction in which the cart 10 enters the non-contact charging cart station 20 is in the Y direction. This direction may be referred to as a cart placement direction.

More specifically, the non-contact charging cart station 20 is covered with a housing 22. The housing 22 includes one or more power transmitting units 21. In FIGS. 3 and 4, a plurality of power transmitting units 21 are aligned in the cart placement direction. An interval of the power transmitting units 21 is substantially equal to an interval of the stacked carts placed on the non-contact charging cart station 20. The non-contact charging cart station 20 also includes a light emitting unit 211 around each of the one or more power transmitting units 21. In an embodiment, an interval of the power transmitting units 21 is substantially equal to an interval of the light emitting units 211. The light emitting unit 211 emits light when the power receiving unit 116 is located at a position opposed to the power transmitting unit 21. Thus, the manager or the like of the retail store can identify whether or not the battery is charged by the non-contact power supply. FIG. 3 and FIG. 4 show a non-contact charging cart station 20 including a plurality of power transmitting units 21 and a plurality of light emitting units 211.

The housing 22 of the non-contact charging cart station has a certain thickness to accommodate the power transmitting unit 21 therein. The non-contact charging cart station 20 has a slope 23 on the entrance side of the cart 10. The slope 23 has an inclination from the surface on which the non-contact charging cart station 20 is provided to the placement region 24 on which the cart 10 is placed. The slope 23 may be referred to as a ramp.

The placement region 24 is provided on the upper surface of the non-contact charging cart station 20. The placement region 24 is a region in which a cart 10 having a commodity registration apparatus 16 and a power receiving unit 116 for receiving power to be supplied to the commodity registration apparatus 16 is placed. The placement region 24 may be referred to as a cart placement surface. The power transmitting unit 21 is disposed substantially horizontally at a position opposed to the power receiving unit 116 in the placement region 24, and generates a magnetic field. In this way, the power transmitting unit 21 transmits power to the power receiving unit 116 by non-contact (wireless) power supply. As a method of non-contact power supply, various methods such as electromagnetic induction type and magnetic field resonance type are known, but, in general, various other non-contact methods can be used. In the present disclosure, the term "non-contact" is used to refer to power transmission being carried out wirelessly as opposed to via wired connections. Therefore, even if the power transmitting unit 21 and the power receiving unit 116 are in contact with each other at the time of power supply, regardless of whether such contact is intended or not, this is still considered to be non-contact power supply since the power transmission is performed without a wired connection between the power transmitting unit 21 and the power receiving unit 116.

In order to dispose the power transmitting unit 21 and the power receiving unit 116 at positions opposed to each other, the cart 10 must be placed at an appropriate position in the width direction (X-axis direction) of the non-contact charging cart station 20 perpendicular to the entering direction of the cart 10.

The non-contact charging cart station 20 includes a central wheel guide portion 25, a first side wheel guide portion 26, and a second side wheel guide portion 27. The central wheel guide portion 25, the first side wheel guide portion 26, and the second side wheel guide portion 27 may be collectively referred to as a wheel guide or cart wheel guide. The central wheel guide portion 25 is a convex part disposed substantially at the center of the non-contact charging cart station 20. Further, the central wheel guide portion 25 extends from the entrance side of the cart 10 to the end of the placement region 24 on which the cart 10 is placed. Further, the central wheel guide portion 25 is increases in width as it advances from the entrance side of the cart 10 to the placement region 24. The central wheel guide portion 25 has a width substantially equal to the width from the front wheel 111 to the front wheel 112 of the cart 10 in the placement region 24. By such a shape, the central wheel guide portion 25 determines the position in the width direction of the front wheels 111 and 112 of the cart 10. That is, the central wheel guide portion 25 determines the position of the cart 10 in the X-axis direction in the non-contact charging cart station 20.

The first side wheel guide portion 26 and the second side wheel guide portion 27 are convex parts which are arranged laterally with respect to the central wheel guide portion 25 in the entering direction of the cart 10. The first side wheel guide portion 26 and the second side wheel guide portion 27 extend from the entrance side of the cart 10 to the end of the placement region 24 on which the cart 10 is placed. Further, the first side wheel guide portion 26 and the second side wheel guide portion 27 are increased in width as they advance from the entrance side of the cart 10 to the placement region 24. In addition, the first side wheel guide portion 26 has substantially the same width as the width from the front wheel 111 to the rear wheel 113 of the cart 10 in the placement region 24. The second side wheel guide portion 27 has substantially the same width as the width from the front wheel 112 to the rear wheel 114 of the cart 10 in the placement region 24.

The distance between the inner side of the first side wheel guide portion 26 and the central wheel guide portion 25 is substantially the same as the width of the front wheel 111. The distance from the inner side of the second side wheel guide portion 27 to the central wheel guide portion 25 is substantially the same as the width of the front wheel 112.

The distance from the outside of the first side wheel guide portion 26 to the outside of the second side wheel guide portion 27 is substantially equal to the width from the rear wheel 113 to the rear wheel 114 of the cart 10. By such a shape, the first side wheel guide portion 26 and the second side wheel guide portion 27 determine the positions of the front wheels 111 and 112 and the rear wheels 113 and 114 of the cart 10 in the width direction.

Therefore, when the cart 10 is placed on the placement region 24, the central wheel guide portion 25, the first side wheel guide portion 26 and the second side wheel guide portion 27 can restrict the position of the cart 10 in the width direction in the non-contact charging cart station 20. That is, the non-contact charging cart station 20 can fix the position of the cart 10 in the X-axis direction.

The width of the gap between the central wheel guide portion 25 and the first side wheel guide portion 26 is substantially the same as the width of the front wheel 111. The front wheel 111 guided by the central wheel guide portion 25 and the first side wheel guide portion 26 runs in a gap between the central wheel guide portion 25 and the first side wheel guide portion 26. That is, the central wheel guide portion 25 and the first side wheel guide portion 26 form a first front wheel running path 242 on which the front wheel 111 of the cart 10 runs. The central wheel guide portion 25 and the first side wheel guide portion 26 forming the first front wheel running path 242 may be referred to as a first wheel guide.

Similarly, the width of the gap between the central wheel guide portion 25 and the second side wheel guide portion 27 is substantially the same as the width of the front wheel 112. The front wheel 112 guided by the central wheel guide portion 25 and the second side wheel guide portion 27 runs in a gap between the central wheel guide portion 25 and the second side wheel guide portion 27. That is, the central wheel guide portion 25 and the second side wheel guide portion 27 form a second front wheel running path 243 on which the front wheel 112 of the cart 10 runs. The central wheel guide portion 25 and the second side wheel guide portion 27 forming the second front wheel running path 243 may be referred to as a second wheel guide.

The central wheel guide portion 25, the first side wheel guide portion 26, and the second side wheel guide portion 27 increase in width as they advance from the entrance side of the cart 10 to the placement region 24. In other words, the first front wheel running path 242 and the second front wheel running path 243 are substantially the same width as the front wheels 111 and 112 in the placement region 24, but the portions entering the first front wheel running path 242 and the second front wheel running path 243 extended in the width direction. The central wheel guide portion 25, the first side wheel guide portion 26 and the second side wheel guide portion 27 have a convex shape.

That is, the placement region 24 includes a first front wheel running path 242 and a second front wheel running path 243, which are the running paths of the wheels of the cart 10, in which the width narrower as the cart 10 advances from the entering side. These portions of the first front wheel running path 242 and a second front wheel running path 243 may be referred to a cart introductory portion. The placement region 24 includes an entrance portion 244 of a first front wheel running path 242 and a second front wheel running path 243.

In this manner, the central wheel guide portion 25, the first side wheel guide portion 26 and the second side wheel guide portion 27 guide the front wheels 111, 112. Therefore, the operator can easily advance the cart 10 along the first front wheel running path 242 and the second front wheel running path 243 by pushing the cart 10 from the entrance side of the non-contact charging cart station 20.

Figure 5:
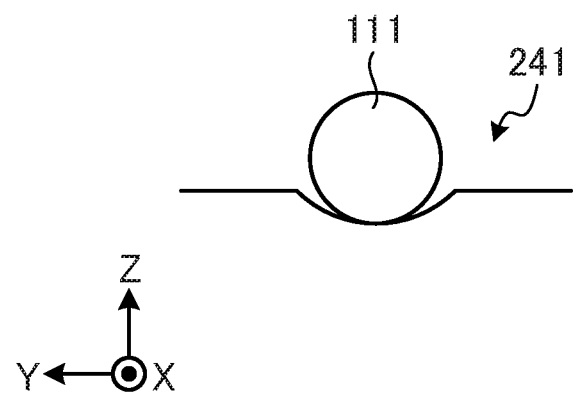
FIG. 5 illustrates a cross-sectional view of a positioning portion.

The first front wheel running path 242 and the second front wheel running path 243 include positioning portions 241 for settling the position of the cart 10 in the entering direction. Each of the positioning portions 241 settles a wheel of the cart 10, i.e., one of the front wheels 111 and 112 thereon by a weight of the cart 10. Here, FIG. 5 illustrates a cross-sectional view of an example of the positioning portion 241. As shown in FIG. 5, the positioning portion 241 is, for example, a recessed part having a smooth curve. The positioning portion 241 may be referred to as a wheel settlement region. In FIGS. 3 and 4, each of the first front wheel running path 242 and the second front wheel running path 243 has a plurality of positioning portions 241 aligned in the entering direction with an interval same as an interval of the power transmitting units 21.

In this way, since the positioning portion 241 has a recessed shape, the front wheels 111 and 112 are disposed on the rolling bottom surface. Therefore, the positioning portion 241 can fix the positions of the front wheels 111 and 112.

That is, the non-contact charging cart station 20 can position of the cart 10 along the entering direction in the placement region 24.

Furthermore, as shown in FIG. 5, the positioning portion 241 has a smooth curved bottom surface. Therefore, the cart be pushed through the positioning portion 241 with relative ease. The positioning portion 241 is not limited to a recessed part having a smooth curved bottom surface, but in other examples may be a simple recessed part having no curved bottom surface. For example, the positioning portion 241 may be simply a recess or gap portion.

Further, as shown in FIG. 1, by inserting the housing part 12 of the one cart 10 into the housing part 12 of another cart 10, it is possible to stack a large number of carts 10 within a small area. Therefore, the interval between adjacent positioning portions 241 along the entering direction is shorter than the total length along the entering direction of the cart 10.

The placement region 24 of the non-contact charging cart station 20 includes a stopping portion 28 for stopping the cart 10 running on the surface on the placement region 24, and the stopping portion 28 is disposed in front side of the entering direction of the cart 10 on the placement region 24. More specifically, the placement unit 24 of the non-contact charging cart station 20 includes a stopping portion 28 at the end of the first front wheel running path 242 and the second front wheel running path 243. The stopping portion 28 is a convex part extending from the outer side of the first side wheel guide portion 26 to the outside of the second side wheel guide portion 27. With such a shape, the stopping portion 28 prevents the front wheels 111 and 112 from being pushed past of the placement region 24 by the operator. That is, the stopping portion 28 prevents the cart 10 from being pushed beyond the placement region 24. It is noted that the stopping portion 28 is not limited to a convex part extending from the outside of the first side wheel guide portion 26 to the outside of the second side wheel guide portion 27, but also may be a projection provided in the first front wheel running path 242 or the second front wheel running path 243. The stopping portion 28 may be referred to as a wheel stop or bumper.

As described above, the non-contact charging cart station 20 includes a placement region 24 on which a cart 10 (having a commodity registration apparatus 16 and a power receiving unit 116) is placed. The power transmitting unit is disposed substantially horizontally at a position opposite to the power receiving unit 116 in the placement region 24. Then, the power transmitting unit 21 transmits power in the vertical direction. Therefore, in the non-contact charging cart station 20, the cart 10 can be disposed at a position opposite to the power transmitting unit 21.

In the example embodiment(s), a non-contact charging cart station 20 is provided on the floor of a cart storage place. However, the non-contact charging cart station 20 of the present disclosure may be built-in at the cart storage place. If the non-contact charging cart station 20 is built-in or embedded at the cart storage place, the slope 23 may be omitted if there is no step up between the non-contact charging cart station 20 and the floor/ground.

In other examples, the non-contact charging cart station 20 may be built-in or embedded in the cart storage place such that the upper surface of the placement region 24 is lower than the floor/ground surface. In such cases, the non-contact charging cart station 20 may have an inclined surface that descends from the floor/ground surface towards the placement region 24. Since the non-contact charging cart station 20 in such an example has an inclined surface that descends from the ground to the placement region 24, the cart 10 can remain on the placement region 24 unless the operator intentionally pulls the cart 10 out.

In the above-described non-contact charging cart station 20, the first front wheel running path 242, and the second front wheel running path 243 are formed by the central wheel guide portion 25, the first side wheel guide portion 26, and the second side wheel guide portion 27. However, the first front wheel running path 242 and the second front wheel running path 243 may be formed by a recess in the floor or the like in some examples.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-contact power supply device, comprising:
a housing having a cart placement region into which stackable carts can be inserted along a cart placement direction, the stackable cart being stackable at a first interval;
three or more non-contact charging devices that are in the housing and aligned in the cart placement region along the cart placement direction at the first interval, wherein each of the non-contact charging devices is configured to perform non-contact charging with respect to a non-contact power receiver of one of the stackable carts stacked at the first interval and inserted into the cart placement region; and
a wheel guide in the cart placement region, the wheel guide extending in the cart placement direction, wherein the wheel guide includes three or more wheel settlement regions aligned along the cart placement direction at the first interval, each of the wheel settlement regions being shaped to fit a wheel of one of the stackable carts stacked at the first interval and inserted into the cart placement region.

2. The non-contact power supply device according to claim 1, wherein each of the non-contact charging devices has a non-contact charging surface parallel to a surface of the cart placement region.

3. The non-contact power supply device according to claim 1, wherein the wheel guide includes a cart introduction portion, and a guide width of the cart introduction portion narrows with distance along the cart placement direction.

4. The non-contact power supply device according to claim 1, further comprising:
a wheel stop provided at an end of the cart placement region.

5. The non-contact power supply device according to claim 1, wherein
the wheel guide includes a first wheel guide and a second wheel guide that extend in the cart placement direction, and
the non-contact charging devices are between the first wheel guide and the second wheel guide.

6. The non-contact power supply device according to claim 5, wherein
the first wheel guide includes three or more first wheel settlement regions aligned along the cart placement direction, each of the first wheel settlement regions being shaped to fit a wheel of one of the stackable carts, and
the second wheel guide includes three or more second wheel settlement regions aligned along the cart placement direction, each of the second wheel settlement regions being shaped to fit a wheel of one of the stackable carts.

7. The non-contact power supply device according to claim 6, wherein
the first wheel settlement regions are aligned at the first interval along the cart placement direction, and
the second wheel settlement regions are aligned at the first interval along the cart placement direction.

8. The non-contact power supply device according to claim 1, further comprising:
three or more light emitting devices in the housing and aligned along the cart placement direction in respective correspondence with the three or more non-contact charging devices at the first interval.

9. The non-contact power supply device according to claim 8, wherein each of the light emitting devices is configured to emit light when a non-contact power receiver of one of the stackable carts is above the corresponding one of the of non-contact charging devices.

10. The non-contact power supply device according to claim 1, wherein the first interval is less that a total length of the stackable cart along the cart placement direction.

11. The non-contact power supply device according to claim 1, wherein the cart placement region includes a ramp that is inclined along the cart placement direction.

* * * * *

UNITED STATES PATENT AND TRADEMARK OFFICE
CERTIFICATE OF CORRECTION

| | | |
|---|---|---|
| PATENT NO. | : 11,299,055 B2 | |
| APPLICATION NO. | : 16/886285 | |
| DATED | : April 12, 2022 | |
| INVENTOR(S) | : Ryohei Miyoshi et al. | |

It is certified that error appears in the above-identified patent and that said Letters Patent is hereby corrected as shown below:

In the Claims

Column 8, Line 47, please delete "of" before "non-contact".

Signed and Sealed this
Fifteenth Day of November, 2022

Katherine Kelly Vidal
*Director of the United States Patent and Trademark Office*